UNITED STATES PATENT OFFICE.

GEORG ERLWEIN AND ALBERT FRANK, OF BERLIN, GERMANY.

CYANID COMPOUND AND PROCESS OF MAKING SAME.

SPECIFICATION forming part of Letters Patent No. 708,333, dated September 2, 1902.

Application filed February 27, 1902. Serial No. 95,935. (No specimens.)

*To all whom it may concern:*

Be it known that we, GEORG ERLWEIN and ALBERT FRANK, doctors of chemistry, subjects of the German Emperor, residing at 88 Markgrafenstrasse, Berlin, Germany, have invented certain new and useful Improvements in Cyanid Compounds and Processes of Making Same; and we do hereby declare the following to be a full, clear, and exact description of the invention, such as will enable others skilled in the art to which it appertains to make and use the same.

The object of our invention is a composition containing cyanid of calcium destined to serve as a substitute for cyanid of potassium in lixiviating the ores or materials containing precious metals; and, further, our invention relates to a process of manufacturing this composition.

The composition according to our invention consists in a molten mass of cyanid of calcium and of a metallic chlorid which may be employed either while still hot or after cooling it. We have found that the chlorids of the alkalies and earth-alkalies and preferably the chlorid of sodium give the best results.

Our process of manufacturing our composition consists in heating cyanamid of calcium (CNNCa) with carbon and a suitable metallic chlorid to a suitable temperature. The cyanamid of calcium and the carbon react according to the following chemical equation:

$$CNNCa + C = Ca(CN)_2.$$

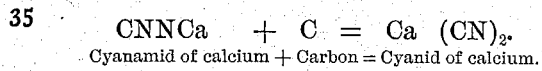
Cyanamid of calcium + Carbon = Cyanid of calcium.

The action of the metallic chlorid consists in favoring the regular course of the reaction, and especially in avoiding the foaming of the reacting mass, and, further, in favoring the lixiviation of the precious metals by the cyanid of calcium contained in the said composition. The mass is particularly suitable for leaching slimes and tailings even though they contain silver.

A suitable proportion of the ingredients we employ to make our composition consists of one part of cyanid of calcium and two parts of a chlorid, preferably chlorid of sodium; but we may also employ a larger or smaller proportion of the metallic chlorid. The skilled workman may choose the proportions according to the course of the process and to the qualities which he intends to give the mass. However, it is not to be recommended to use too large a proportion of the chlorid, and thereby obtaining a product too poor in cyanid of calcium. The proportion of carbon we employ to obtain our composition is given by the above-mentioned chemical equation. Twelve parts of carbon at least should be employed for eighty parts of cyanamid of calcium.

To smelt or fuse the mass, we heat the mixture of cyanamid of calcium, carbon, and metallic chlorid to a suitable temperature, which temperature we maintain until the foaming of the molten mass ceases, which occurs after from half an hour to one hour. Then the mass may be scooped out from the vessel in which the process is carried out, or the mass may be poured out or removed in any other suitable manner, so as to cool it down on a cool support. We also may cool the mass in the vessel and remove the same after cooling.

The cyanamid of calcium which we employ according to our process is advantageously obtained from the carbid by the action of nitrogen, which we pass over carbid of calcium at a suitable high temperature. We have found that a cyanamid of calcium obtained by the action of nitrogen on carbid of calcium and carbon is especially suitable for our purpose. The composition may also be directly used—*i. e.*, without previously purifying it—for the manufacture of hydrocyanic acid by treating the composition by acids—for instance, hydrochloric acid.

Instead of cyanamid of calcium obtained from carbid of calcium and nitrogen to make our composition we also may employ cyanamid of calcium which is made in usual manner. When cyanamid of calcium obtained from carbid of calcium is employed, the further addition of carbon may be omitted in most cases, because the mass which results from the action of the nitrogen on carbid of calcium mostly contains free carbon, the reaction of nitrogen on the carbid being as follows:

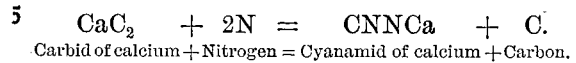
Carbid of calcium + Nitrogen = Cyanamid of calcium + Carbon.

Having now particularly described and ascertained the nature of our said invention and the manner in which the same is to be performed, we declare that what we claim is—

1. Composition containing cyanid of calcium destined to serve as a substitute for cyanids of the alkalies consisting in a molten mass of cyanid of calcium and a metallic chlorid.

2. Composition containing cyanid of calcium destined to serve as a substitute for cyanids of the alkalies consisting in a molten mass of cyanid of calcium and chlorid of sodium.

3. Process of manufacturing a composition containing cyanid of calcium consisting in heating a mixture of cyanamid of calcium, carbon and a metallic chlorid until the mass melts.

4. Process of manufacturing a composition containing cyanid of calcium consisting in heating a mixture of cyanamid of calcium, carbon and chlorid of sodium until the mass melts.

In testimony whereof we have affixed our signatures in presence of two witnesses.

GEORG ERLWEIN.
ALBERT FRANK.

Witnesses:
WOLDEMAR HAUPT,
HENRY HASPER.